United States Patent [19]
Renzi et al.

[11] Patent Number: 5,128,384
[45] Date of Patent: Jul. 7, 1992

[54] PROCESS FOR PREPARING ORGANIC GLASSES

[75] Inventors: Fiorenzo Renzi, Gorgonzola; Franco Rivetti, Schio; Claudio Gagliardi, San Donato Milanese; Ugo Romano, Vimercate, all of Italy

[73] Assignee: Enichem Synthesis S.p.A., Palermo, Italy

[21] Appl. No.: 751,648

[22] Filed: Aug. 26, 1991

Related U.S. Application Data

[63] Continuation of Ser. No. 365,094, Jun. 12, 1989, abandoned.

[30] Foreign Application Priority Data

Jun. 17, 1988 [IT] Italy .................. 21009 A/88

[51] Int. Cl.⁵ ............................................. C08F 2/46
[52] U.S. Cl. .................................... 522/13; 522/78; 522/167
[58] Field of Search .................... 522/13, 78, 167

[56] References Cited

U.S. PATENT DOCUMENTS

| | | | |
|---|---|---|---|
| 4,049,757 | 9/1977 | Kammel et al. | 264/22 |
| 4,561,951 | 12/1985 | Neckers | 522/33 |
| 4,620,954 | 11/1986 | Singer et al. | 264/1.4 |
| 4,835,233 | 5/1989 | Renzi et al. | 526/301 |

Primary Examiner—Marion E. McCamish
Assistant Examiner—Mark A. Chapman
Attorney, Agent, or Firm—Hedman, Gibson & Costigan

[57] ABSTRACT

Organic glasses and surface coatings are prepared, with short hardening cycles, by submitting to the action of U.V. light a liquid polymerizable composition containing at least one di-(allyl carbonate) or poly(allyl carbonate) of a diol or polyol, a photoinitiator and a vinyl ester monomer and/or an organic peroxide.

The composition can additionally contain small amounts of an organic compound selected from among those compounds which are used in the art in order to stabilize the organic polymers to the degrading action of U.V. light.

The composition is preferably heated before being treated with U.V. light.

14 Claims, 1 Drawing Sheet

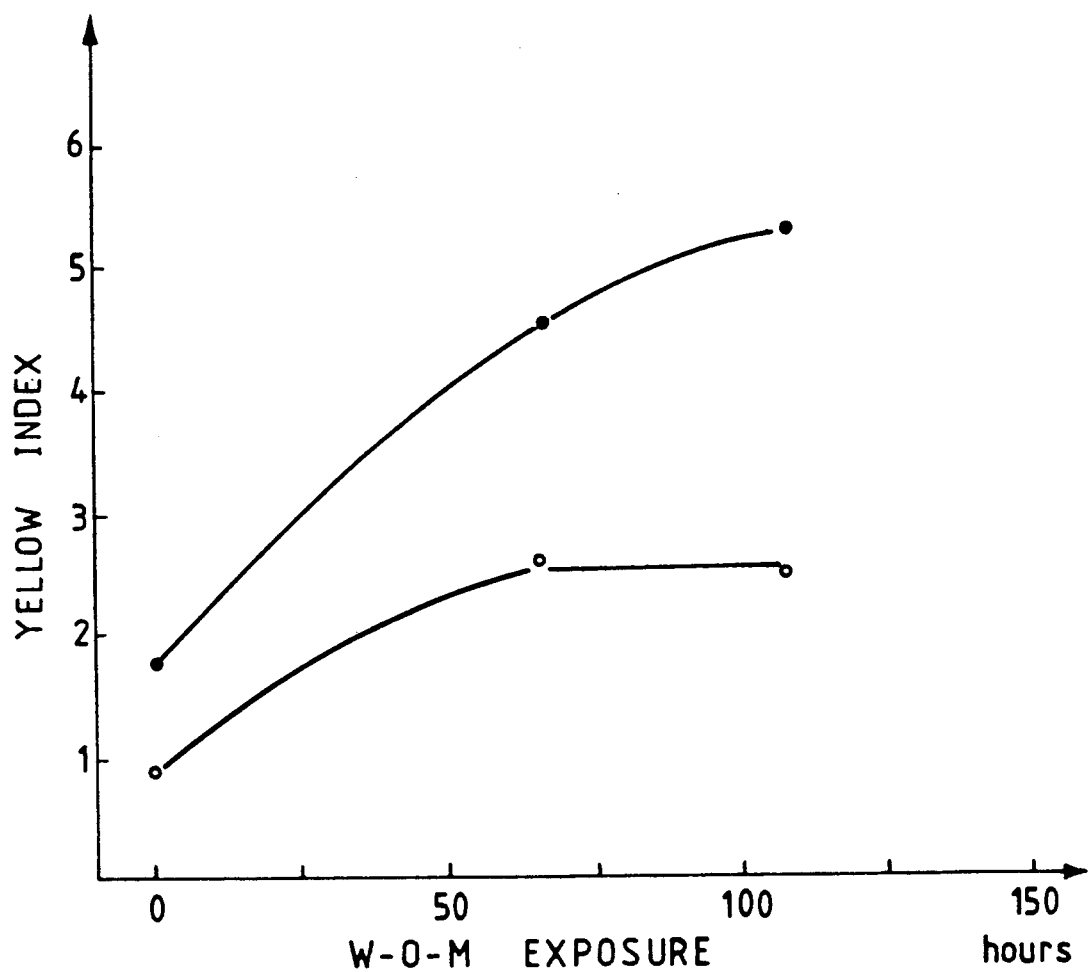

PROCESS FOR PREPARING ORGANIC GLASSES

This is a continuation of co-pending application Ser. No. 07/365,094, filed Jun. 12, 1989, now abandoned.

The present invention relates to a process for preparing organic glasses by means of the polymerization of a liquid composition containing at least one di-(allyl carbonate) or poly-(allyl carbonate) of a diol or polyol.

Among the allyl carbonate monomers, bis-(allyl carbonate) of diethylene glycol, polymerized in the form of a thermosetting resin, is the one which was most successful and which asserted itself in applications at the industrial level in the preparation of organic glasses and optical articles endowed with particularly high optical and mechanical characteristics (F. Strain, "Encyclopaedia of Chemical Processing and Design", Vol. I, Interscience Publishers, New York, 1964, pages 799-foll.).

In the industrial practice the optical articles obtained from this material, such as corrective ophthalmic lenses or sun glasses, shields, protective masks, and so forth, are endowed with extremely good characteristics of transparence, absence of colour, abrasion resistance, resistance to solvents and to ageing. Said optical articles are normally produced by polymerizing the monomer inside a mould (casting process), with the preliminary addition of a polymerization initiator of peroxy type.

The polymerization is normally carried out in an oven, or in a water bath, within times ranging from about ten hours up to more tens of hours, depending on the optical article which is being produced, and following a suitable temperature profile. The long polymerization time constitutes the main limit of the process, in that it has a great influence on the economy of the process, and reduces the productivity. This explains the limited use, or the non-use of the material in question in large consume sectors, such as the automobile sector, the sector of glasses for the building industry, and the like, in spite of its excellent optical and mechanical features.

U.S. Pat. No. 4,521,577 discloses liquid compositions comprising allyl carbonate monomers, polymerizable by a radicalic route to yield organic glasses. These compositions require hardening times comprised within the range of from 3 to 100 hours.

U.S. patent application Ser. No. 942.381 discloses liquid compositions comprising allyl carbonate monomers, polymerizable by a radicalic route to yield organic glasses. These compositions require hardening times comprised within the range of from 1 to 5 hours.

In U.K. patent application No. 2,171,709, a liquid composition containing diethylene-glycol bis-(allyl carbonate) and up to 40% by weight of a vinyl ester is hardened with a peroxide through a pre-polymerization step, followed by a step of true polymerization. In Example 1 of this patent application, the true polymerization step requires a time of 8 hours.

The present Applicant has found now that the liquid compositions which contain one or more allyl carbonate monomers and a photoinitiator in combination with limited amounts of a vinyl monomer and/or with an organic peroxide can be polymerized producing completely hardened organic glasses or surface coatings within a time not higher than about 15 minutes.

In accordance therewith, the present invention relates to a process for preparing organic glasses or surface coatings by means of the polymerization of a composition containing at least one allyl carbonate monomer, said process being characterized in that a polymerizable liquid composition which contains:

(a) at least one bis-(allyl carbonate) or poly-(allyl carbonate) of respectively a diol or polyol;

(b) a vinyl ester, with a weight ratio of said (a) component to said (b) component comprised within the range of from 100:0 to 70:30;

(c) an organic peroxide in an amount comprised within the range of from 0 to 5 parts by weight per each 100 parts by weight of the total of (a) and (b) components; and (d) an organic photoinitiator in an amount comprised within the range of from 0.5 to 5 parts by weight per each 100 parts by weight of the total of (a) and (b) components, under the provision that the (b) and (c) components are not simultaneously absent, is submitted to the action of U.V. light.

In the preferred form of practical embodiment, both of said (b) and (c) components will be present.

The composition can also additionally contain small amounts of an (e) component, selected from among those used in the art in order to stabilize the organic polymers to the degrading action of U.V. light.

In the preferred form of practical embodiment the polymerizable liquid composition is heated to a temperature higher than room temperature before being submitted to the action of U.V. light.

(A) COMPONENT

The (a) component of the composition is a bis-(allyl carbonate) or poly-(allyl carbonate) respectively of a diol or of a polyol. Useful for the intended purpose are the bis-(allyl carbonates) of aliphatic or cycloaliphatic diols such as propylene glycol, diethylene glycol, triethylene glycol, tetraethylene glycol, butanediol, hexanediol, neopentyl glycol, cyclohexanedimethanol and bis-(hydroxymethyl)-tricyclodecane.

Also useful for the intended purpose are the poly-(allyl carbonates) polyols, such as tris-(allyl carbonate) of trimethylolpropane and of tris-hydroxyethyl-isocyanurate and pentaerythritol tetrakis-(allyl carbonate).

These allyl carbonate compounds can be obtained by means of a reaction of transesterification, by reacting diallyl carbonate with the diol or polyol, such as disclosed, e.g., in European patent application Publ. No. 35,304.

When the process is carried out by means of a transesterification, as the reaction products monomeric bis- or poly-(allyl carbonates) respectively of diols or of polyols, in mixture with the relevant oligomers, as a function of the ratio of the diallyl carbonate reactants to the diol or polyol, are obtained.

So, e.g., by reacting diallyl carbonate with diethylene glycol, bis-(allyl carbonates) of diethylene glycol are obtained, which can be defined by the following general formula:

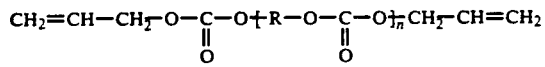

wherein:

R is the diethylene glycol radical, and n varies as a function of the ratio of the reactants to each other, as reported in the following table.

More in particular, in this table by $R^o$ the molar ratio of the diallyl carbonate to diethylene glycol in the transesterification is indicated, and the reported percentages, for each individual ratio, represent the percent contents by weight of the monomer (n=1) and of the oligomers (n>1) in the reaction mixture.

| $R^o$ | 12/1 | 8.5/1 | 6/1 | 4/1 | 2/1 |
|---|---|---|---|---|---|
| n = 1 | 88.3% | 83.0% | 75.8% | 64.6% | 33.9% |
| n = 2 | 10.5% | 14.4% | 18.8% | 23.9% | 25.1% |
| n = 3 | 1.1% | 2.2% | 4.1% | 7.9% | 16.6% |
| n = 4 | 0.1% | 0.3% | 0.9% | 2.5% | 10.2% |
| n = 5 | — | — | 0.2% | 0.7% | 6.2% |
| n = 6 | — | — | — | 0.2% | 3.5% |
| n = 7 | — | — | — | — | 2.1% |
| n = 8 | — | — | — | — | 1.1% |
| n = 9 | — | — | — | — | 0.6% |
| n = 10 | — | — | — | — | 0.3% |

A similar behaviour is observed when the transesterification is carried out with the other diols and with the polyols.

Also those compositions in which the bis-(allyl carbonate) or poly-(allyl carbonate) constituting the (a) component is partially in monomer form, and partially in oligomer form, on condition that the content of oligomer does not exceed about 70% in the mixture, are useful for the purposes of the present invention.

The preferred (a) components for the purposes of the present invention are diethylene-glycol bis-(allyl carbonate), dimethylol-cyclohexane bis-(allyl carbonate), tris-hydroxyethyl isocyanurate tris-(allyl carbonate) and pentaerythritol tetrakis-(allyl carbonate), possibly partially present in oligomer form, or their mixtures. Also in case of use of mixtures, the total content of the oligomers shall be not higher than the hereinabove specified value.

(B) COMPONENT

The (b) component of the composition is a vinylic ester and is advantageously selected from among vinyl acetate, vinyl pivalate, vinyl ester of Versatic acid, vinil benzoate, vinyl propionate, vinyl adipate and vinyl succinate.

Most preferred is vinyl acetate. The (b) component of the present invention can be present or, under the above reported proviso, can be absent and the weight ratio of the (a) component to the (b) component can be comprised within the range of from 100:0 to 70:30.

The (b) component is preferably present in the composition, and the weight ratio of the (a) component to the (b) component is maintained comprised within the range of from 85:15 to 96:4.

(C) COMPONENT

The (c) component of the composition is an organic peroxide which, under the above specified proviso, can be absent. Anyway, it is preferably present in an amount of from 1 to 5 parts by weight per each 100 parts by weight of the total of the (a) and (b) components. The organic peroxides useful for the intended purpose are those which are soluble in the liquid composition, and are capable of generating free radicals within a temperature range of from 30° to 120° C.

Non-limitative examples of such organic peroxides are diisopropyl peroxydicarbonate, dicyclohexyl peroxydicarbonate, di-sec.butyl peroxydicarbonate, sec.-butyl-cyclohexyl peroxydicarbonate, tert.-butyl perbenzoate, tert.-butyl perpivalate and benzoyl peroxide.

More preferably, the (c) component is present in the composition in an amount comprised within the range of from 2 to 4 parts by weight per each 100 parts by weight of the total of the (a) and (b) components.

(D) COMPONENT

The (d) component of the composition is an organic photoinitiator, which is present in an amount comprised within the range of from 0.5 to 4 parts by weight per each 100 parts by weight of the total of (a) and (b) components. The organic photoinitiators useful for the purpose of the invention are those compounds which are soluble in the liquid composition and are capable of generating free radicals under the action of U.V. light.

Non-limitative examples of such organic photoinitiators are benzil-dimethyl-ketal, 2-hydroxy-2-methyl-1-phenyl-propanone-1, thioxanthone and benzoin ethers.

The (d) component is preferably present in an amount comprised within the range of from 1 to 3 parts by weight per each 100 parts by weight of the total of (a) and (b) components.

According to a preferred form of practical embodiment of the present invention, the polymerizable liquid composition additionally contains small amounts of an organic compound [the (e) component], selected from among those used in the art in order to stabilize the organic polymers to the degrading action of U.S. light. Such stabilizing organic compounds are advantageously selected from among sterically hindered amines, benzophenones and benzotriazoles. The sterically hindered amines are those which are normally known in the art as "HALS"; a typical example of them is the commercial product TINUVIN 770 by Ciba-Geigy.

Examples of benzophenones suitable for the intended purpose are 2-hydroxy-4-methoxy-benzophenone, 2-hydroxy-4-octoxy-benzophenone, 2-hydroxy-4-isooctoxybenzophenone and 2-hydroxy-4-dodecyloxy benzophenone.

Examples of triazoles useful for the intended purpose are 2-(3'-tert.-butyl-2'-hydroxy-5'-methylphenyl)-5-chloro-benzotriazole, 2-(3',5'-di-tert.-butyl-2'-hydroxyphenyl)-5-chloro-benzotriazole, and 2-(2'-hydroxy-3',5'-di-tert.-amyl-phenyl)-benzotriazole.

The present Applicant has surprisingly found that when said (e) component in present in amounts of the order of from 0.05 to 0.15 parts by weight per each 100 parts by weight of the total of (a) and (b) components, it does not have a meaningful influence on the course of the polymerization of the composition, and considerably improves the ageing resistance and the optical characteristics of the so obtained organic glasses. The figure shows the improvement in yellow index after ageing of the composition of the present invention.

The liquid polymerizable composition can additionally contain one or more conventional additives, such as mould-release agents, dyeing agents, pigments are the like, in any case in a total amount not higher than 1% by weight relatively to the weight of the same composition.

The hereinabove disclosed composition can be used as a protective coating on solid substratexs, such as wood (furniture pieces and floors), metals, plastic materials and fabrics. The coating will preferbly have a thickness comprised within the range of from 5 to 500

μm. The coated articles show characteristics of scratch resistance, of resistance to solvents, and of high gloss.

The liquid polymerizable composition is preferably transformed into organic glasses by means of the in-mould polymerization process (the casting process). According to a preferred form of practical embodiment, according to which the (c) component is present, said composition, once poured into the mould, is submitted to a preheating, before being treated with U.V. light. The temperature at which the composition is pre-heated can vary as a function of the particular peroxide used, and will be generally comprised within the range of from 40° to 120° C., and preferably of the order of from 70° to 90° C.

In this way, the polymerization is initiated by the free radicals generated by the decomposition of the initiators contained in the same composition, by thermal effect, and by the treatment with U.V. light.

By operating according to the process of the present invention, the polymerization times are in any case shorter than about 15 minutes and typically are of the order of a few minutes. The so obtained organic glasses show hgih optical properties (transparence, absence of colour, low optical distorsion) and good mechanical and thermal properties, as it will be evident from the following experimental examples, which are reported for the purpose of merely exemplifying the present invention without limiting it.

In said examples, the liquid compositions, comprising the peroxidic initiator and the photoinitiator are prepared, and said compositions are then submitted to polymerization inside glass moulds assembled with a gasket of plasticized poly-(vinyl chloride), which determines the thickness of the produced organic glass. In particular, flat sheets having a thickness of 1.4 mm and 3.0 mm, and neutral lenses having a thickness of 2 mm are prepared.

The compositions are polymerized by means of the irradiation with U.V. light emitted by a medium-pressure mercury U.V. lamp of 80 W/cm of power, placed at a distance of 11 cm from the sample to be polymerized. Said sample is conveyed on a conveyor belt at a running speed of 5 metres/minute, and is polymerized by means of a series of repeated exposures on both of its sides, at time intervals of about 5 seconds.

In some cases, the polymerization with U.V. light is preceded by a heating of a few minutes, so as to increase the temperature of the sample to values of the order of 90° C. The advantages achieved by means of this treatment are of kinetic character (reduction of the exposure times) and in terms of improved optical quality in the obtained organic glasses (lower optical distorsion).

On the obtained organic glasses the values of the following characteristics are determined.

A) OPTICAL CHARACTERISTICS

Refractive index ($n_D^{20}$): measured by means of the Abbe refractometer (ASTM D-542)

Haze and Transmittance in the visible range (%): measured by means of the Gradner's Hazegard XL-211 (ASTM D-1003)

Yellow index (YI), defined as:

$$YI = \frac{100}{Y}(1.227X - 1.06)$$

determined by means of Gardner's XL-805 colorimeter (ASTM D-1925).

B) PHYSICAL AND MECHANICAL CHARACTERISTICS

Density: measured by means of the hydrostatic balance at the temperature of 25° C. (ASTM D-792)

Volume reduction during polymerization (Shrinkage), computed by means of the following formula:

$$\% \text{ Shrinkage} = \frac{(\text{polymer density} - \text{monomer density})}{(\text{polymer density})} \times 100$$

Rockwell hardness (M), measured by means of the Rockwell Durometer (ASTM D-785)

Elastic bending modulus (ASTM D-790)

Sutherland abrasion resistance.

The test is carried out on the lenses and consists in submitting the sample to 25 cycles (50 passages) of abrasion by means of a pad of steel wool of 2/0 grade of 5.5×7.5 cm of size, loaded with a weight of 630 g. The produced abrasion degree is evaluated by means of the visual observation of the number, the length and the depth of the scratches, as compared to a reference sample of the basis of the homopolymer of diethyleneglycol bis-(allyl carbonate). The resistance to abrasion is expressed by means of a score from a scale of from 0 to 10, with value 0 being assigned to the completely scratched sample [case of homopolymer of diethylene glycol bis-(allyl carbonate)], assuamed as the reference sample, and value 10 being assigned to acratch-free samples. The intermediate values of from 1 to 9 are assigned on the basis of the percentage of scratches shown by the tested sample relatively to the reference sample. For example, if the sample shows 60% of scratches relatively to the reference sample, its value of abrasion strength is 4, and if is shows 30% of scratches its value is 7, and so on.

C) THERMAL CHARACTERISTICS

Distorsion temperature under a load of 1.82 MPa (HDT) (ASTM D-648).

D) AGEING RESISTANCE

The ageing resistance is determined by means of the exposure of the samples to U.V. light in a Weather-O-Meter (ATLAS), equipped with a Xenon lamp of 6,500 W, with continuous irradiation. The temperature on the black reference panel is of 63° C. and the relative humidity is of 50%. The ageing resistance is evaluated by determining the Yellow Index after variable times of exposure to U.V. Light.

The examples of polymerization from 1 to 3 report polymerization kinetics which are evaluated by determining the conversion of the allyl unsaturations by means of measurements of density as a function of the number of passages under the U.V. light lamp.

EXAMPLE 1

Liquid polymerizable compositions are prepared, which contain different amounts of diethylene-glycol bis-(allyl carbonate) and of vinyl acetate.

Diethylene-glycol bis-(allyl carbonate), (DEG-BAC) is the product of transesterification of diallyl carbonate with diethylene glycol, in a mutual molar ratio of 12:1, and is a mixture of monomer and oligomers definable by means of the formula:

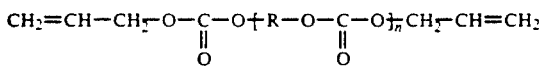

wherein:
R = radical of diethylene glycol

| | |
|---|---|
| n = 1 | 88.3% by weight |
| n = 2 | 10.5% by weight |
| n = 3 | 1.1% by weight |
| n = 4 | 0.1% by weight |

To these compositions dicyclohexyl peroxydicarbonate (DCPD) and 2-hydroxy-2-methyl-1-phenyl-propanone-1 (commerical product DAROCUR 1173) are added.

The so prepared compositions from 1 to 6 are reported in Table 1. In this Table, the composition 1 is the comparative composition.

TABLE 1

| | Composition No. | | | | | |
|---|---|---|---|---|---|---|
| | 1 | 2 | 3 | 4 | 5 | 6 |
| DEG-BAC | 100 | 100 | 95 | 95 | 90 | 90 |
| Vinyl acetate | — | — | 5 | 5 | 10 | 10 |
| DAROCUR 1173 | 2 | 2 | 2 | 2 | 2 | 2 |
| DCPD | — | 3 | — | 3 | — | 3 |

The values reported in the table for the individual components are parts by weight.

The compositions are polymerized by casting, to yield flat sheets of 1.4 mm of thickness, by means of irradiation with the U.V. lamp and the degree of conversion of the allyl unsaturations is determined by means of measurements of density as a function of the number of passages under the U.V. lamp. The conversion is expressed as the percent value of the observed increase in density relatively to the total increase in density obtained under conditions of complete polymerization, i.e., when the density of the polymer reaches a constant value.

The results of these determinations are reported in Table 2.

TABLE 2

| | Number of passages of exposure to U.V. light | | | | | | Polymer density on conversion complete |
|---|---|---|---|---|---|---|---|
| | 15 | | 20 | | 30 | | |
| Composition No. | Density (g/ml) | Conversion (%) | Density (g/ml) | Conversion (%) | Density (g/ml) | Conversion (%) | |
| 1 | — | — | — | — | 1.2029 | 35.8 | 1.311 |
| 2 | — | — | 1.1735 | 18.4 | 1.2107 | 40.5 | 1.311 |
| 3 | — | — | 1.1806 | 27.6 | 1.2120 | 45.6 | 1.3068 |
| 4 | 1.1648 | 18.6 | 1.1823 | 28.6 | 1.2205 | 50.5 | 1.3068 |
| 5 | — | — | 1.1821 | 33.9 | 1.2285 | 60.3 | 1.2982 |
| 6 | 1.1785 | 31.8 | 1.2257 | 58.7 | 1.2758 | 87.2 | 1.2982 |

EXAMPLE 2

Polymerizable compositions are prepared which contain dimethylol-cyclohexane bis-(allyl carbonate) (CEDM-BAC), vinyl acetate, DCPD and DAROCUR 1173. Dimethylol-cyclohexane bis-(allyl carbonate) is the product of transesterification of diallyl carbonate with 1,4-dimethylol-cyclohexane in the mutual molar ratio of 4:1, and is a mixture of monomer and oligomers, with a content of oligomers of the order of about 35% by weight.

The compositions from 7 to 9 are reported in following Table 3, in which the values represent the parts by weight of the individual constituents. The compositions are polymerized and evalutated in the same way as in Example 1. The results are reports in Table 4.

TABLE 3

| | Composition No. | | |
|---|---|---|---|
| | 7 | 8 | 9 |
| CEDM-BAC | 100 | 95 | 90 |
| Vinyl acetate | — | 5 | 10 |
| DAROCUR 1173 | 2 | 2 | 2 |
| DCPD | 3 | 3 | 3 |
| Density (at 20° C.) | 1.1070 | 1.0965 | 1.0883 |

TABLE 4

| | Number of passages of exposure to U.V. light | | | | | | Polymer density on conversion complete |
|---|---|---|---|---|---|---|---|
| | 15 | | 20 | | 30 | | |
| Composition No. | Density (g/ml) | Conversion (%) | Density (g/ml) | Conversion (%) | Density (g/ml) | Conversion (%) | |
| 7 | 1.1356 | 28 | 1.1528 | 44.8 | 1.1785 | 69.9 | 1.2093 |
| 8 | 1.1462 | 45 | 1.1579 | 55.6 | 1.1913 | 85.8 | 1.2069 |
| 9 | 1.1582 | 58 | 1.1772 | 73.7 | 1.19905 | 91.8 | 1.2088 |

EXAMPLE 3

Polymerizable compositions are prepared which contain tris-hydroxyethyl-isocyanurate tris-(allyl carbonate) (THEIC-TAC), vinyl acetate, DCPD and DAROCUR 1173.

Tris-hydroxyethyl-isocyanurate tris-(allyl carbonate) is the product of transesterification of diallyl carbonate with tris-hydroxyethyl-isocyanurate in the mutual molar ratio of 12:1, and is a mixture of monomer and oligomers, with a content of oligomers of the order of about 25-30% by weight in the mixture.

The so prepared compositions from 10 to 12 are reported in following Table 5, in which the values represent the parts by weight of the individual constituents. The compositions are polymerized and evalutated in the same way as in Example 1. The results are reported in Table 6.

TABLE 5

| | Composition No. | | |
|---|---|---|---|
| | 10 | 11 | 12 |
| THEIC-TAC | 100 | 95 | 90 |
| Vinyl acetate | — | 5 | 10 |
| DAROCUR 1173 | 2 | 2 | 2 |
| DCPD | 3 | 3 | 3 |
| Density (at 20° C.) | 1.280 | 1.2576 | 1.2370 |

TABLE 6

| | Number of passages of exposure to U.V. light | | | | | | Polymer density on conversion complete |
|---|---|---|---|---|---|---|---|
| | 15 | | 20 | | 30 | | |
| Composition No. | Density (g/ml) | Conversion (%) | Density (g/ml) | Conversion (%) | Density (g/ml) | Conversion (%) | |
| 10 | — | — | 1.3761 | 92.7 | 1.3835 | 99.9 | 1.3836 |
| 11 | 1.32265 | 80.1 | 1.3674 | 92.5 | 1.3755 | 99.3 | 1.3763 |
| 12 | 1.3591 | 96 | 1.36225 | 98.5 | 1.3620 | 98.3 | 1.3642 |

EXAMPLE 4

Polymerizable compositions are prepared which contain 1,4-dimethylol-cyclohexane bis-(allyl carbonate) (CEDM-BAC of Example 2), diethylene-glycol bis-(allyl carbonate) (DEG-BAC), vinyl acetate, DCPD, DAROCUR 1173 and the U.V. stabilizer 2-hydroxy-4-methoxy-benzophenone (commercial product CYASORB UV 9 manufactured by the U.S. Company American Cyanamid).

Diethylene-glycol bis-(allyl carbonate) is the product of transesterification of diallyl carbonate with diethylene glycol in the mutual molar ratio of 2:1, and is a mixture of monomer and oligomers definable by means of the formula:

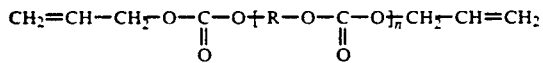

wherein:
R = radical of diethylene glycol

| n = 1 | 33.9% by weight |
|---|---|
| n = 2 | 25.1% by weight |
| n = 3 | 16.6% by weight |
| n = 4 | 10.2% by weight |
| n > 4 | 14.2% by weight |

The so prepared compositions 13 and 14 are reported in following Table 7, in which the values represent the parts by weight of the individual constituents.

TABLE 7

| | Composition No. | |
|---|---|---|
| | 13 | 14 |
| CEDM-BAC | 60 | 60 |
| DEG-BAC | 40 | 40 |
| Vinyl acetate | 5 | 10 |
| DAROCUR 1173 | 2 | 2 |
| DCPD | 3 | 3 |
| CYASORB UV 9 | 0.08 | 0.08 |

With these compositions neutral lenses of 2 mm of thickness are prepared by means of 30 passages of both of their sides of the hereinabove described U.V. apparatus.

The U.V. treatment is preceded by a preliminary thermal treatment of 3 minutes in a forced-air-circulation oven at 90° C.

A the end of the U.V. irradiation, of the total duration of about 5 minutes, at the opening of the mould a perfectly hardened lens is recovered, which is endowed with good optical properties. The characteristics of said lens are reported in Table 8. For comparative purposes, the compositions 13(a) and 14(a), at all similar to Compositions 13 and 14, but without the photoinitiator DAROCUR 1173 are submitted to the hardening process.

In this case, the hardening is obtained in a conventional way by means of a cycle of 20 hours inside a water bath at a temperature of from 40° to 80° C. The results relevant to these comparative tests are also reported in Table 8.

TABLE 8

| | Composition No. | | | |
|---|---|---|---|---|
| | 13 | 14 | 13(a) | 14(a) |
| Yellow Index | 0.68 | 0.62 | 0.38 | 0.11 |
| Haze (%) | 0.10 | 0.12 | 0.05 | 0.10 |
| Transmittance in the Visible Range (%) | 93.0 | 93.0 | 93.1 | 93.1 |
| Rockwell Hardness (M) | 90 | 91 | 93 | 93 |
| Sutherland Abrasion Resistance | 1 | 1 | 1 | 1 |
| Specific Gravity (g/ml) | 1.2480 | 1.2469 | 1.2487 | 1.2480 |

EXAMPLE 5

The polymerizable compositions 15 and 16 are prepared. These compositions are similar to the polymerizable compositions 13 and 14 of Example 4, but with tris-hydroxyethyl-isocyanurate tris-(allyl carbonate) (THEIC-TAC of Example 3) being used in lieu of CEDM-BAC, as reported in Table 9.

TABLE 9

| | Composition No. | |
|---|---|---|
| | 15 | 16 |
| THEIC-TAC | 40 | 40 |
| DEG-BAC | 60 | 60 |
| Vinyl acetate | 5 | 10 |
| DAROCUR 1173 | 2 | 2 |
| DCPD | 3 | 3 |
| CYASORB UV 9 | 0.08 | 0.08 |

These compositions are polymerized in the same way as in Example 4 to yield neutral lenses of 2 mm of thickness. The results are reported in Table 10, together with the results relevant to the Compositions 15(a) and 16(a), polymerized according to the traditional route in the absence of a photoinitiator.

TABLE 10

| | Composition No | | | |
|---|---|---|---|---|
| | 15 | 16 | 15(a) | 16(a) |
| Yellow Index | 0.60 | 0.62 | 0.10 | 0.08 |
| Haze (%) | 0.15 | 0.16 | 0.21 | 0.16 |
| Transmittance in the Visible Range (%) | 93.0 | 92.9 | 93.0 | 93.0 |
| Rockwell Hardness (M) | 90 | 91 | 92 | 91 |
| Sutherland Abrasion Resistance | 2 | 2 | 3 | 2 |
| Specific Gravity (g/ml) | 1.3400 | 1.3370 | 1.3451 | 1.3370 |

EXAMPLE 6

The polymerizable compositions 17 and 18 are prepared. These compositions are similar to the polymerizable compositions of Example 4, but with pentaerythritol tetrakis-(allyl carbonate) (PE-TETRAKIS) being used in lieu of CEDM-BAC. Said pentaerythritol tetrakis-(allyl carbonate) is the product of transesterification between diallyl carbonate and pentaerythritol in the mutual molar ratio of 24:1, and is a mixture of monomer and oligomers with a content of oligomers of about 20-25% by weight in the mixture.

The compositions are reported in Table 11.

TABLE 11

| | Composition No. | |
|---|---|---|
| | 17 | 18 |
| PE-TETRAKIS | 30 | 30 |
| DEG-BAC | 70 | 70 |
| Vinyl acetate | 5 | 10 |
| DAROCUR 1173 | 2 | 2 |
| DCPD | 3 | 3 |
| CYASORB UV 9 | 0.08 | 0.08 |

These compositions are polymerized in the same way as in Example 4 to yield neutral lenses of 2 mm of thickness. The results are reported in Table 12, together with the results relevant to the Compositions 17(a) and 18(a), polymerized according to the traditional route in the absence of a photoinitiator.

TABLE 12

| | Composition No. | | | |
|---|---|---|---|---|
| | 17 | 18 | 17(a) | 18(a) |
| Yellow Index | 0.75 | 0.69 | 0.31 | 0.12 |
| Haze (%) | 0.26 | 0.32 | 0.25 | 0.30 |
| Transmittance in the Visible Range (%) | 93.2 | 93.2 | 93.2 | 93.0 |
| Rockwell Hardness (M) | 98 | 98 | 100 | 100 |
| Sutherland Abrasion Resistance | 7 | 7 | 7/8 | 7 |
| Specific Gravity (g/ml) | 1.3240 | 1.3210 | 1.3243 | 1.3200 |

EXAMPLE 7

The polymerizable compositions from 19 to 21 reported in Table 13 are prepared.

TABLE 13

| | Composition No. | | |
|---|---|---|---|
| | 19 | 20 | 21 |
| THEIC-TAC (*) | 26 | 26 | 26 |
| DEG-BAC (**) | 37 | 37 | 37 |
| DEG-BAC (***) | 37 | 37 | 37 |
| Vinyl acetate | 10 | 8 | 5 |

TABLE 13-continued

| | Composition No. | | |
|---|---|---|---|
| | 19 | 20 | 21 |
| DAROCUR 1173 | 2 | 2 | 2 |
| DCPD | 3 | 3 | 3 |
| CYASORB UV 9 | 0.08 | 0.08 | 0.08 |
| Refractive index $[n_D^{20}]$ | 1.457 | 1.459 | 1.461 |
| Viscosity at 25° C., cst | 27 | 38 | 45 |
| Density (at 20° C.) (g/ml) | 1.177 | 1.180 | 1.187 |

(*) Product of transesterification of diallyl carbonate and tris-hydroxyethyl isocyanurate in the mutual molar ratio of 12:1.
(**) Product of transesterification of diallyl carbonate and diethylene glycol in the mutual molar ratio of 2:1.
(***) Product of transesterification of diallyl carbonate and diethylene glycol in the mutual molar ratio of 12:1.

These compositions are polymerized, by operating in the same way as in Example 4, to yield flat sheets of 1.4 mm of thickness; the relevant characteristics are reported in Table 14.

TABLE 14

| | Composition No. | | |
|---|---|---|---|
| | 19 | 20 | 21 |
| Specifc Gravity at 20° C. (g/ml) | 1.3265 | 1.3268 | 1.3311 |
| Shrinkage (%) | 11.3 | 11.1 | 10.8 |
| Refractive Index $[n_D^{20}]$ | 1.5002 | 1.5008 | 1.5016 |
| Yellow Index | 0.60 | 0.79 | 0.80 |
| Haze (%) | 0.22 | 0.20 | 0.27 |
| Transmittance in the Visible Range (%) | 93 | 93 | 93 |
| Rockwell Hardness (M) | 83 | 82 | 80 |

EXAMPLE 8

The composition No. 21, reported in Example 7, is polymerized to yield flat sheets of 3 mm and 1.7 mm of thickness. By operating under the same conditions as of Example 4, the polymerization is complete and polymerized sheets are obtained, which characteristics similar to those of sheets obtained by means of the traditional thermal route. Such characteristics, relevant to the sheets of 3 mm of thickness, are reported in Table 15. The sheets of 1.4 mm of thickness are used in order to evaluate the ageing resistance, carried out in the Weather-O-Meter.

The results are reported in Figure of the hereto attached drawing table, in which the Yellow Index is plotted as a function of the exposure time (o—o line).

By operating in a similar way, but with a composition not containing CYASORB UV 9, the behaviour represented by line •—• is obtained.

The addition of CYASORB UV 9 makes it possible the yellow index of the sheet, both as measured soon after the polymerization of the sheet, and after ageing, to be improved.

TABLE 15

| | Composition No. 21 |
|---|---|
| Yellow Index | 0.89 |
| Haze | 0.23 |
| Transmittance in the Visible Range (%) | 93.1 |
| Refractive Index $[n_D^{20}]$ | 1.5015 |
| Specific Gravity (g/ml) | 1.331 |
| Bending Elastic Modulus (MPa) | 2700 |
| Ultimate Bending Strength (MPa) | 102 |
| Shrinkage (%) | 10.8 |
| Rockwell Hardness (M) | 100 |
| Impact Strength (IZOD without notch) (kJ/m²) | 22.6 |

TABLE 15-continued

|  | Composition No. 21 |
|---|---|
| HDT (°C.) | 66 |

EXAMPLE 9

The liquid polymerizable compositions 22 and 23 are prepared by starting from the same components as of Example 5, as reported in Table 16.

TABLE 16

|  | Composition No. | |
|---|---|---|
|  | 22 | 23 |
| THEIC-TAC | 80 | 80 |
| DEG-BAC | 20 | 20 |
| Vinyl acetate | — | 5 |
| DAROCUR 1173 | 2 | 2 |
| DCPD | 3 | 3 |

The viscosity of composition 22 is of 5,500 cSt and the viscosity of composition 23 is of 980 cSt.

The compositions are applied by means of a film spreader instrument on aluminum sheets or on wooden sheets, and films of about 200 μm of thickness are formed.

The hardening of the so obtained coatings is carried out by means of the exposure, under an inert atmosphere (nitrogen), to the light of a medium-pressure mercury U.V. lamp of 500 W of power, placed at a distance of 15 cm, for a time of 1 minute.

At the end of the exposure to U.V. light, the coatings result to be completely polymerized, as determined by measurements of density.

Furthermore, the coatings are free from defects, and are endowed with characteristics of high hardness and high gloss.

We claim:

1. A process for preparing organic glasses or surface coatings by means of the polymerization of a composition containing at least one allyl carbonate monomer, said process comprising submitting a polymerizable liquid composition which comprises:
   (a) at least one bis-(allyl carbonate) or poly-(allyl carbonate) of respectively a diol or polyol;
   (b) a vinyl ester, with a weight ratio of said (a) component to said (b) component ranging from 100:0 to 70:30;
   (c) an organic peroxide in an amount ranging from 0 to 5 parts by weight per each 100 parts by weight of the total of (a) and (b) components; and
   (d) an organic photoinitiator in an amount ranging from 0.5 to 5 parts by weight per each 100 parts by weight of the total of (a) and (b) components,
under the proviso that the (b) and (c) components are not simultaneously absent; to the action of U.V. light for a time of not longer than about 15 minutes.

2. A process according to claim 1, wherein the (a) component of the composition comprises a bis-(allyl carbonate) of a diol selected from the group consisting of propylene glycol, diethylene glycol, triethylene glycol, tetraethylene glycol, butanediol, hexanediol, neopentyl glycol, cyclohexanedimethanol and bis(hydroxymethyl)-tricyclodecane; or comprises a tris-(allyl carbonate) of a triol selected from the group consisting of trimethylol-propane and tris-hydroxyethylisocyanurate; or comprises pentaerythritol tetrakis-(allyl carbonate), or their mixtures.

3. A process according to claim 1, wherein said (a) component is selected from the group consisting of diethylene glycol bis-(allyl carbonate), dimethylolcyclohexane bis(allyl carbonate), tris-hydroxymethyl isocyanurate tris-(allyl carbonate) and pentaerythritol tetrakis-(allyl carbonate), and their mixtures.

4. A process according to claim 1, wherein said (a) component is a mixture of monomer and oligomer, with the amount of oligomer being not larger than about 70% by weight of the total mixture.

5. A process according to claim 1, wherein the (b) component is selected from the group consisting of vinyl acetate, vinyl pivalate, vinyl ester of Versatic acid, vinyl benzoate, vinyl propionate, vinyl adipate and vinyl succinate.

6. A process according to claim 5, wherein said (b) component comprises vinyl acetate.

7. A process according to claim 1, wherein the (c) component is present in an amount of from 1 to 5 parts by weight per each 100 parts by weight of the total of the (a) and (b) components.

8. A process according to claim 1, wherein the (c) component is selected from the group consisting of diisopropyl peroxydicarbonate, dicyclohexyl peroxydicarbonate, disec.-butyl peroxydicarbonate, sec.-butylcyclohexyl peroxy-dicarbonate, tert.-butyl perbenzoate, tert.-butyl perpivalate and benzoyl peroxide.

9. A process according to claim 1, wherein the (d) component is selected from the group consisting of benzyl-dimethyl-ketal, 2-hydroxy-2-methyl-1-phenyl-propanone-1, thioxanthone and benzoin ethers.

10. A process according to claim 1, wherein the composition contains the (a) and (b) components in a mutual ratio ranging from 85:15 to 96:4 by weight, the (c) component is present in an amount ranging from 2 to 4 parts by weight per each 100 parts by weight of the total of the (a) and (b) components, and the (d) component is present in an amount ranging from 1 to 3 parts by weight per each 100 parts by weight of the total of the (a) and b) components.

11. A process according to claim 1, wherein said liquid polymerizable composition additionally comprises from 0.05 to 0.15 parts by weight, per each 100 parts by weight of the total of the (a) and (b) components, of an organic stabilizer selected from the group consisting of sterically hindered amines, benzophenones and benzotriazoles.

12. A process according to claim 1, wherein said liquid polymerizable component additionally comprises one or more additives selected from among mold release agents, dyeing agents and pigments.

13. A process according to claim 1, wherein the liquid polymerizable composition is preheated at a temperature ranging from 40° to 120° C. before being submitted to the action of U.V. light.

14. A process according to claim 13, wherein said composition is preheated at a temperature of from 70° to 90° C.

* * * * *